(12) United States Patent
Chen

(10) Patent No.: US 12,225,359 B2
(45) Date of Patent: Feb. 11, 2025

(54) USB MICROPHONE FOR WIRELESS TRANSMISSION

(71) Applicant: Shenzhen Shidser Trading Co., Ltd., Shenzhen (CN)

(72) Inventor: Yudong Chen, Shenzhen (CN)

(73) Assignee: Shenzhen Shidser Trading Co., Ltd., Shenzhen (CN)

( * ) Notice: Subject to any disclaimer, the term of this patent is extended or adjusted under 35 U.S.C. 154(b) by 209 days.

(21) Appl. No.: 18/087,843

(22) Filed: Dec. 23, 2022

(65) Prior Publication Data

US 2024/0121553 A1    Apr. 11, 2024

(30) Foreign Application Priority Data

Oct. 11, 2022   (CN) .......................... 202211232289.0

(51) Int. Cl.
| | |
|---|---|
| *H04R 3/00* | (2006.01) |
| *G06F 3/16* | (2006.01) |
| *H04R 1/04* | (2006.01) |
| *H04R 1/08* | (2006.01) |

(52) U.S. Cl.
CPC .............. *H04R 3/00* (2013.01); *G06F 3/165* (2013.01); *H04R 1/04* (2013.01); *H04R 1/086* (2013.01); *H04R 2420/07* (2013.01); *H04R 2420/09* (2013.01)

(58) Field of Classification Search
CPC . G06F 3/16; G06F 3/162; G06F 3/165; H04R 1/021; H04R 1/04; H04R 1/08; H04R 1/083; H04R 1/086; H04R 3/00; H04R 2420/03; H04R 2420/07; H04R 2420/09

USPC .......................................... 381/111, 122, 355
See application file for complete search history.

(56) References Cited

U.S. PATENT DOCUMENTS

| | | | | |
|---|---|---|---|---|
| 2010/0020983 | A1* | 1/2010 | Waites .................... | H04R 5/04 381/79 |
| 2020/0128317 | A1* | 4/2020 | Feldman ............... | H04R 1/083 |

FOREIGN PATENT DOCUMENTS

| | | |
|---|---|---|
| CN | 213028459 U | 4/2021 |
| CN | 213485110 U | 6/2021 |
| CN | 215420652 U | 1/2022 |

* cited by examiner

*Primary Examiner* — Harry S Hong
(74) *Attorney, Agent, or Firm* — Nitin Kaushik

(57) ABSTRACT

The invention provides a USB microphone for wireless transmission, which relates to the specific application in the field of U-band wireless transmission. It is a USB microphone for wireless transmission, comprising a holder and a base shell. The top of the holder is attached to the fixing frame by screws. Within the fixing frame there is a mute button attached by screws, a microphone core and lithium batteries. The first PCBA board is screwed inside the fixing frame. The second PCAB board is screwed inside the base shell, and it is provided with an output for USB at one end. A face shell is set on top of the base shell. By combining UHF wireless transmission with a USB microphone, the invention frees the USB microphone from the length of the USB cable and enables USB transmission of digital signals for recording while being used wirelessly.

7 Claims, 5 Drawing Sheets

USB MICROPHONE FOR WIRELESS TRANSMISSION

CROSS-REFERENCE TO RELATED APPLICATIONS

The application claims priority to Chinese patent application No. 2022112322890, filed on Oct. 11, 2022, the entire contents of which are incorporated herein by reference.

TECHNICAL FIELD

The invention relates to specific applications in the field of U-band wireless transmission, specifically a USB microphone for wireless transmission.

BACKGROUND

U-band wireless transmission technology: U-band UHF, also named Ultra High Frequency in full. UHF is the ITU's designation for radio frequencies in the range of 300 megahertz (MHz) to 3 gigahertz (GHz), also known as the decimetre band as its wavelength range of 1 metre to a tenth of a metre (1 decimetre). Radio waves with frequencies above the UHF fall into the super-high frequency (SHF) or microwave frequency range. Frequencies below UHF fall in the very-high frequency (VHF) or lower frequency range. UHF radio waves propagate mainly by line of sight; although signal transmission through building walls is strong enough, they are blocked by mountains and large buildings. They are used for television broadcasting, mobile phones, satellite communications (including GPS), personal radio services (including Wi-Fi and Bluetooth), walkie-talkies, cordless phones, satellite phones and many other applications. The range of UHF bands available for civil use varies from country to country and being a civil product requires the use of a compliant band and certification for that country.

If a microphone is used as a recording device and needs to be recorded into a computer, it requires a device that converts the analogue signal into a digital signal—a sound card—in order to record the signal picked up by the microphone into the computer. The USB microphone can be connected to the computer through a USB cable and generates digital signal directly (the microphone converts the analogue signal internally into digital signal); however, traditional USB microphones cannot be used with long USB cables due to the speed of the USB transmission, which can cause problems such as interruption of the USB AUDIO signal, resulting in broken sound and popping. Therefore, the limitation that USB cable cannot be too long makes it impossible to apply the USB microphone in the situations when it is far from the computer. This greatly limits the scenarios and experience of customers using the product.

SUMMARY

Part 1. Technical Problems Solved

In response to the shortcomings of the prior technology, the invention provides a USB microphone for wireless transmission, solving the problem that exist with the traditional USB microphone. The shortcomings of the traditional technology are that USB microphones cannot be used with long USB cables due to the speed of the USB transmission, which can cause problems such as interruption of the USB AUDIO signal, resulting in broken sound and popping. Therefore, the limitation that USB cable cannot be too long makes it impossible to apply the USB microphone in the situations when it is far from the computer. This greatly limits the scenarios and experience of customers using the product.

Part 2. Technical Solutions

To achieve the above, this invention is realized by the following technical solutions: a USB microphone for wireless transmission, comprising a holder and a base shell. The top of the holder is attached to the fixing frame by screws. The fixing frame is set up with a front wind screen on one side and a rear screen on the other. The front wind screen and the rear screen are fitted to the fixing frame. Within the fixing frame there is a mute button attached by screws, a microphone core and lithium batteries. The first PCBA board is screwed inside the fixing frame, and it is provided with a charging port on one side and a headphone jack on the other side of the bottom. The bottom end of the holder is threaded with a rotating ball, and the bottom end of the rotating ball is rotatably connected to the base. The second PCAB board is screwed inside the base shell, and it is provided with an output for headphones at one end and for USB at the other end. A face shell is set on top of the base shell, and fits to each other. A protection cap is provided on the right side of the USB port.

Preferably, the mute button contains a power supply indicator button and a PCBA board.

Preferably, the first PCBA board contains the UHF wireless transmitter chip and the power switch.

Preferably, the second PCBA board contains a UHF wireless receiver chip and a USB Audio converter chip.

Preferably, the mute button and microphone core are electrically connected to the first PCBA board and the first PCBA board is electrically connected to lithium batteries.

Preferably, wireless transmission is possible within the first PCBA board using 2.4 GHz and using VHF V-band.

Preferably, a lanyard is wrapped around one side of the protection cap, and the other end of the lanyard is attached to one side of the face shell by means of a ring.

Working principle: The microphone transmitter is switched on to working status via the power switch. The lithium battery powers it. The UHF wireless transmitter chip uses the UHF band of 430-1492 Mhz to perform a band search to enter the pairing status. The receiver is connected to the computer. At this time the computer supplies the receiver with power and transmits digital signals through the USB port. The receiver is automatically into the pairing state, and receives the instructions given by the transmitter. The two successful paired, and the indicator light indicates that the pairing is successful. The sound is then created into the microphone, which passes through the front wind screen and rear screen into the microphone core, where it is transmitted to the first PCBA board and converted into a digital signal in the first PCBA board. The digital signal is transmitted to the receiver through the UHF wireless transmitter chip. The receiver receives the digital signal through the second PCBA board, and after processing by the USB Audio converter chip and the internal DSP algorithm, the digital signal is sent to the computer through the USB port. The Codec of the USB Audio converter chip is converted into an analogue signal and sent to the headphone output, while the digital signal sent by the computer can be mixed directly in the USB Audio chip and converted into an analogue signal and sent to the headphone output for monitoring.

Part 3. Beneficial Effects

The invention provides a USB microphone for wireless transmission. It has the following beneficial effects:
1. By combining UHF wireless transmission with a USB microphone, the invention frees the USB microphone from the length of the USB cable and enables USB transmission of digital signals for recording while being used wirelessly, ensuring easy and convenient recording while widening the application scenarios (long distance recording, outdoor scenarios, etc.).
2. When the receiver receives the digital signal from the first PCBA board through the second PCBA board, the invention will send the digital signal to the computer through the USB port after processing by the USB Audio conversion chip and internal DSP algorithm. The Codec of the USB Audio converter chip is converted into an analogue signal and sent to the headphone output, while the digital signal sent by the computer can be mixed directly in the USB Audio chip and converted into an analogue signal and sent to the headphone output for monitoring, enhancing the practicality of the product.

DETAILED DESCRIPTION OF THE EMBODIMENTS

In conjunction with accompanying drawings in the embodiments, the technical solutions of the invention will be clearly and completely described below. It is clear that the embodiments described are only a part of, not all of the embodiments of the invention. Based on the embodiments in the invention, all other embodiments, which obtained without creative labour by a person of ordinary skill in this field, fall within the scope of protection of this invention.

EMBODIMENTS

Figure 1:
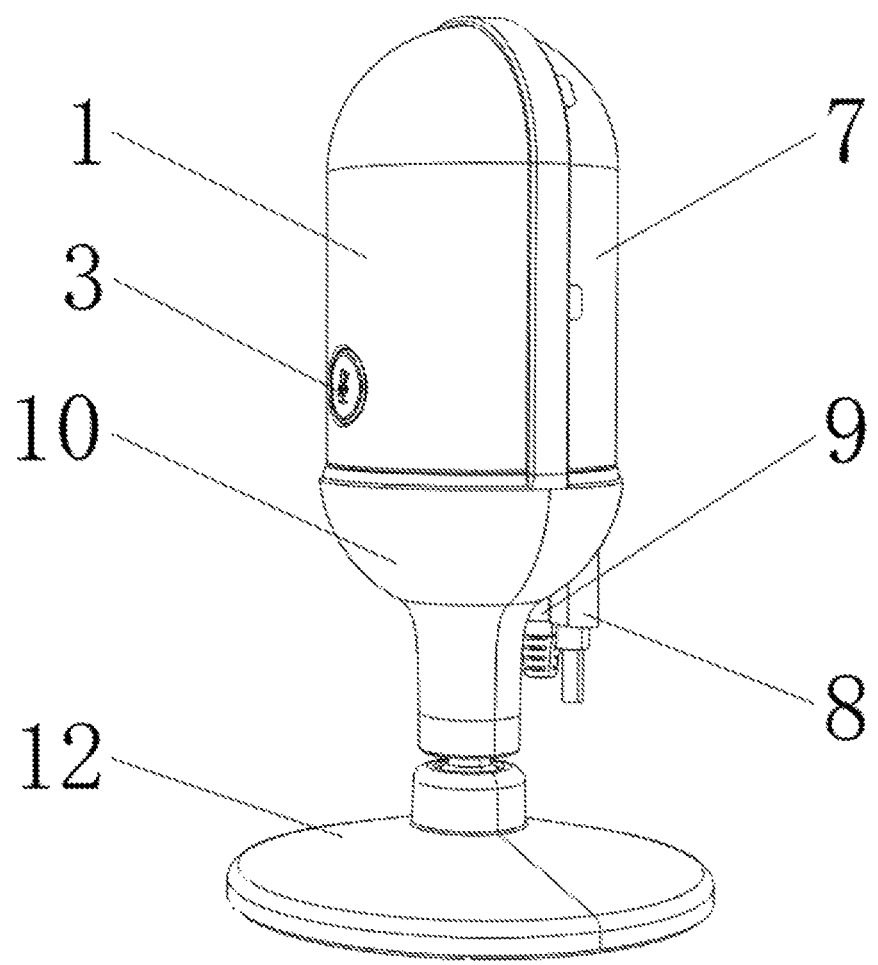
FIG. 1 shows a three-dimensional view of the USB microphone.
Figure 2:
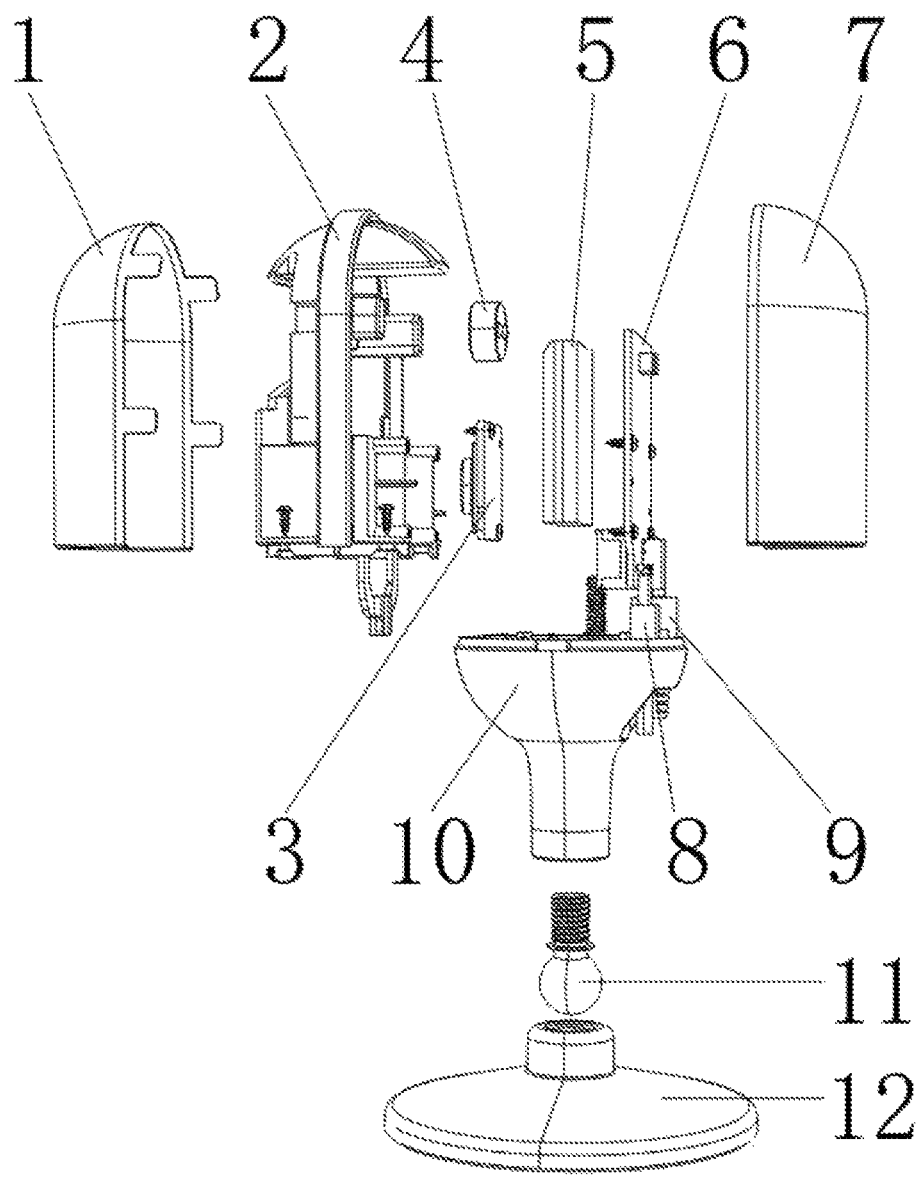
FIG. 2 shows an exploded view of the USB microphone.
Figure 3:
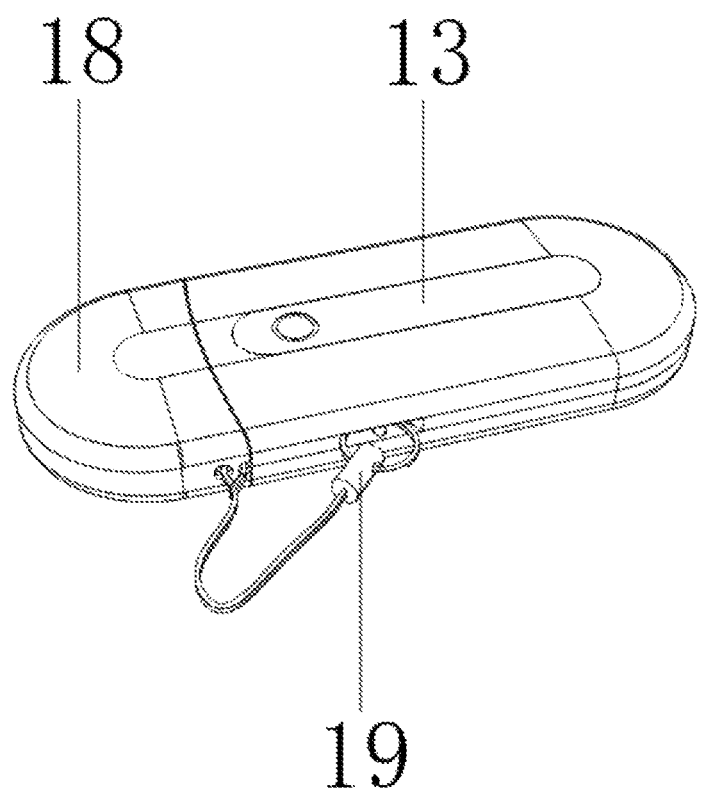
FIG. 3 shows a three-dimensional view of the USB microphone receiver.
Figure 4:
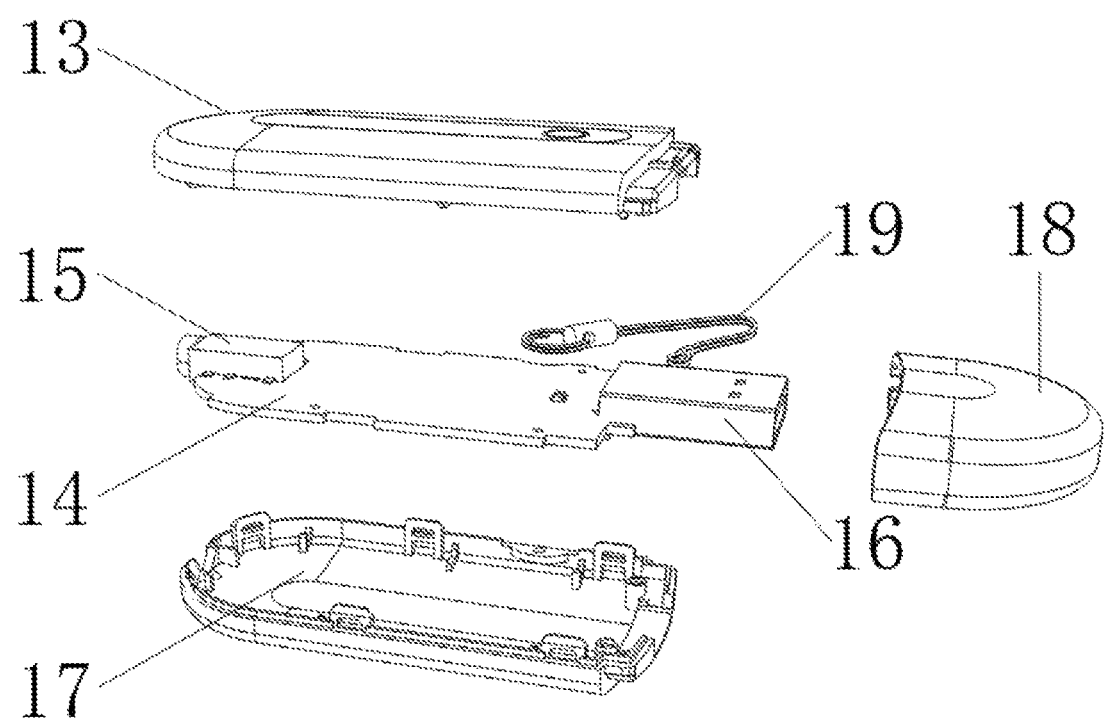
FIG. 4 shows an exploded view of the USB microphone receiver.
Figure 5:
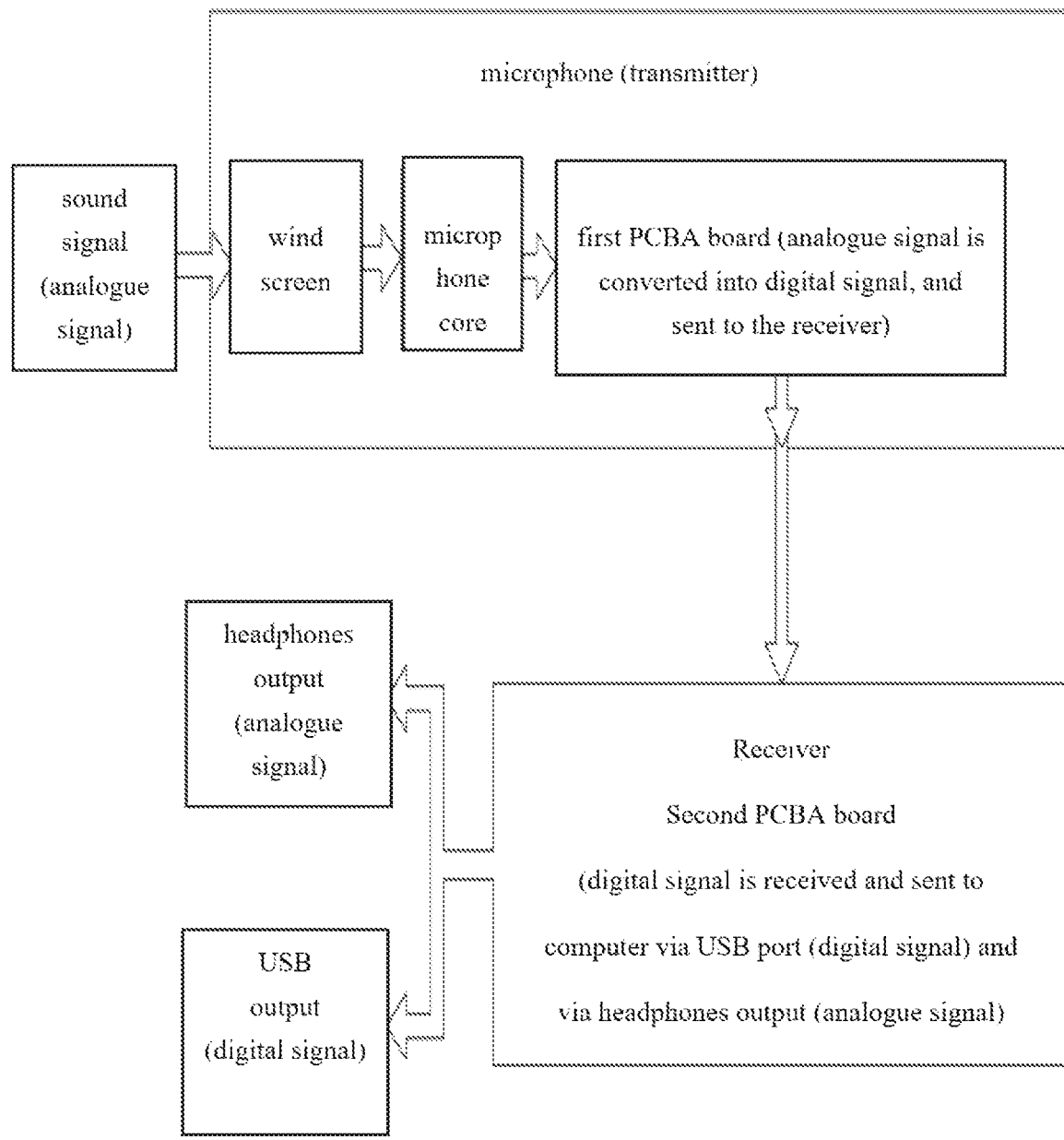
FIG. 5 shows the Alabs Iron Mini-WL signal flow diagram for the USB microphone receiver.
Where 1, front wind screen; 2, fixed frame; 3, mute button; 4, microphone core; 5, lithium battery; 6, first PCBA board; 7, rear screen; 8, charging port; 9, headphone jack; 10, holder; 11, rotating ball; 12, base: 13, face shell; 14, second PCBA board; 15, headphone output; 16, USB port; 17, base shell; 18, protection cap; 19, lanyard.

As shown in FIGS. 1-5, embodiments of the invention provide a USB microphone for wireless transmission, comprising a holder 10 and a base shell 17. The fixing frame 2 is screwed to the top of the holder 10 and serves to fix the front wind screen 1 and the rear screen 7. The fixing frame 2 is set up with a front wind screen 1 on one side and a rear screen 7 on the other. The wind screen 1 and the rear screen 7 are fitted to the fixing frame 2 to protect the microphone itself and reduce the impact of airflow, serving to reduce the "POP sound" and breath sounds when recording vocals. Within the fixing frame 2 there is a mute button 3 attached by screws, and it contains a touch button and an indicator light. The fixing frame 2 is also equipped with a microphone core 4 inside, which performs part of the top and side appearance of the product. Lithium battery 5 is installed inside the fixing frame 2, which provides electrical energy for the microphone body and is electrically connected to the first PCBA board 6 and can be controlled and charged via an external switch and charging port 8. The microphone transmitter has a power consumption of 100 mA, the lithium battery 5 has a capacity of 800 mAh and the operating temperature (temperature of the first PCBA board 6) is below 40°. The first PCBA board 6 is screwed inside the fixing frame 2, and it is provided with a charging port 8 on one side and a headphone jack 9 on the other side of the bottom. The first PCBA board 6 contains the main product circuitry, the UHF wireless transmitter chip, the power management chip and other electronic components. The receiver has a power consumption of 100 mA and the operating temperature (temperature of the second PCBA board 14) is below 40°, providing the main functionality for the product. The bottom end of the holder 10 is threaded with a rotating ball 11, which is rotatably connected to the base 12 to support the microphone, allowing for angle adjustment and removal, making the product a professional desktop microphone. The second PCAB board 14 is screwed inside the base shell 17, and it is provided with an output for headphones 15 at one end and for USB 16 at the other end. Second PCBA board 14 performs the main function, containing UHF wireless receiver chip, USB Audio converter chip (DSP) and power management chip. A face shell 13 is set on top of the base shell 17, and fits to each other to provide the protection and fixing functions. A protection cap 18 is provided on the right side of the USB port 16.

Mute button 3 contains the power supply indication button and the PCBA board. Mute button 3 mainly controls the input of the microphone. If the microphone is switched off, it cannot input the voice. PCBA board is an important electronic component, a support body for electronic components and a provider of wiring connections for electronic components.

The first PCBA board 6 contains a UHF wireless transmitter chip and a power switch. The UHF wireless transmitter chip transmits and sends the digital signals converted in the first PCBA board 6 to the receiver, and the power switch mainly controls the switching on and off of the microphone.

The second PCBA board 14 contains a UHF wireless receiver chip and a USB Audio converter chip. The UHF wireless receiver chip is mainly used to receive digital signals transmitted by the UHF wireless transmitter chip. The Codec of the USB Audio converter chip turns the digital signal into an analogue signal and sends to the headphone output, while the digital signal sent by the computer can be mixed directly in the USB Audio chip and converted into an analogue signal.

Both the mute button 3 and the microphone core 4 are electrically connected to the first PCBA board 6, which is electrically connected to the lithium battery 5. First the lithium battery 5 powers the first PCBA board 6, and then the first PCBA board 6 supplies power to the mute button 3 and the microphone core 4.

Within the first PCBA board 6, wireless transmission is available through 2.4 GHz and the VHF V-band for different conditions and scenarios.

Protection cap 18 has a lanyard 19 wrapped around one side and the other end of the lanyard 19 is attached to the side of the face shell 13 by means of a ring, linking the protective cover 18 to the product body and preventing loss.

Although embodiments of the invention have been presented and described, it will be understood by those of ordinary skill in the field that a variety of variations, modifications, replacements and variants of these embodiments can be made without departing from the principles and spirit of the invention, the scope of which is limited by the appended claims and their equivalents.

What is claimed is:

1. A universal serial bus (USB) microphone for wireless transmission, comprising: a holder (10) and a base shell (17), wherein a top of the holder (10) is connected to a fixing frame (2) by screws; a front wind screen (1) is provided on a side of the fixing frame (2), and a rear screen (7) is provided on another side of the fixing frame (2); the front wind screen (1) and the rear screen (7) are fitted to the fixing frame (2); the fixing frame (2) is internally connected to a mute button (3) by other screws; a microphone core (4) and lithium batteries (5) are provided inside the fixing frame (2); a first printed circuit board assembly (PCBA) board (6) is internally connected to the fixing frame (2) by still other screws; a charging port (8) is provided on a side of a bottom of the fixing frame (2), and a headphone jack (9) is provided on another side of the bottom of the fixing frame (2); a bottom end of the holder (10) is connected to a rotating ball (11) through thread; and a bottom end of the rotating ball (11) is rotatably connected to a base (12); and a second PCAB board (14) is provided inside the base shell (17); a headphone output port (15) is provided at an end of the base shell (17), and a USB port (16) is provided at another end of the base shell (17); a face shell (13) is provided on top of the base shell (17), and the face shell (13) and the base shell fit to each other; and a protection cap (18) is provided on a right side of the USB port (16).

2. The USB microphone for wireless transmission according to claim 1, wherein the mute button (3) includes a power supply indication button and a PCBA board.

3. The USB microphone for wireless transmission according to claim 1, wherein the first PCBA board (6) includes an ultra high frequency (UHF) wireless transmitter chip and a power switch.

4. The USB microphone for wireless transmission according to claim 1, wherein the second PCBA board (14) includes an UHF wireless receiver chip and a USB audio converter chip.

5. The USB microphone for wireless transmission according to claim 1, wherein the mute button (3) and the microphone core (4) are electrically connected to the first PCBA board (6), and the first PCBA board (6) is electrically connected to the lithium batteries (5).

6. The USB microphone for wireless transmission according to claim 1, wherein the first PCBA board (6) is capable of performing wireless transmission at 2.4 GHz and in a very-high frequency (VHF) band.

7. The USB microphone for wireless transmission according to claim 1, wherein an end of a lanyard (19) is wound on one side of the protection cap (18), and another end of the lanyard (19) is attached to one side of the face shell (13) by means of a ring.

* * * * *